Oct. 13, 1942.  D. S. ROSS  2,298,591
CHAIN
Filed Oct. 3, 1941
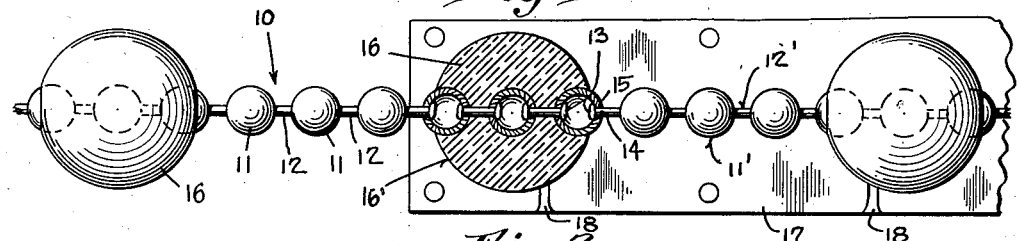

Patented Oct. 13, 1942

2,298,591

UNITED STATES PATENT OFFICE 2,298,591

CHAIN

David S. Ross, Easton, Conn.

Application October 3, 1941, Serial No. 413,413

11 Claims. (Cl. 59—80)

This invention relates to improvements in chains, particularly to that type known as bead chain.

Objects of the present invention include the provision of: an improved ornamental chain; an improved connector for use with chains; a chain lending itself to divers color and divers ornamentation effects; an ornamental and utilitarian chain which may be made from very short lengths of bead chain; simple methods for making economical utilitarian and ornamental chains; a simple and advantageous apparatus for making chain; a bead chain entirely eliminating the use of metal; novel pendants; and sturdy chain connectors.

Features resulting from the attainment of these objects include the provision of: novel plastic members joining short lengths of bead chain, to make possible use of otherwise scrap material and to provide uninterrupted light transmission through the plastic member for bright ornamentation; a novel swivelling connection between beads and larger ornamental plastic members; a novel connection to make a chain endless and to change a long length of chain into several complete members; novel pendants and pendant-securing arrangements; a nonmetal chain; a chain made entirely from plastic material; members which may be reversed, extended and put together in divers ways to make different objects and to alter the ornamental or aesthetic appearance of certain objects.

Other objects, features and advantages will hereinafter appear.

In the drawing:

Figure 1 is a view of one form of chain, and schematically shows the die for forming the same.

Fig. 2 is a view similar to Fig. 1 showing a modified form of the invention.

Fig. 3 is a detailed view of a connector.

Figs. 4 through 9 are detailed views of proposed pendants provided by the present invention.

Fig. 10 is a fragmentary detail view of a non-metallic form of the present invention.

Fig. 11 is a fragmentary detail of a link form of the invention.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation. Also, the term "plastic" or "plastic material" as used herein is intended to embrace nonmetallic materials (e. g., Lucite, Bakelite, hard rubber, protein or protein formaldehyde, polystyrene, polyvinyl chloride, Saran, other macromolecular material, etc.).

Referring now in detail to the drawing, and to Fig. 1 particularly, it should be noted that the present invention provides a bead chain 10 including hollow beads 11 interconnected by links 12. This bead chain 10 may be of the conventional and well-known type wherein the links 12 are shaped like miniature "dumbbells," or have enlarged ends or heads 13 enveloped by the hollow beads 11. In order to allow a certain amount of movement between interconnected beads 11 shanks 14 on links 12 are preferably made slightly smaller than openings 15 in beads 11. Although a small size bead chain is shown in the present drawing, for illustrative purposes, larger and even smaller sizes of bead chain may be employed.

Of particular importance, the present invention provides a member 16, preferably of plastic material, molded directly upon the bead chain in such a manner that it cannot shift longitudinally upon the chain, as shown by the sectional view of the member 16 in Fig. 1. This permanency of relation of the member, or members, 16 with beaded chain 10 is advantageous when the chain is used for ornamental purposes since the bracelet, necklace or the like will, therefore, retain the desired symmetrical appearance; or, in instances where the chain is to be used for mechanical purposes, similarly to a toothed chain, it will then always properly engage and mesh with suitable sprocket wheels.

Preferably the members 16 are molded on the chain 10 in such a manner that links 12 which project outwardly from the beads 11 enveloped by the plastic members 16 are not in any way directly engaged by the plastic material of the members 16 so that said links are completely free for the movement which they normally have relative to the associated beads. To accomplish this the plastic members 16 are preferably molded so that the periphery thereof extends somewhat beyond the largest diameter of the beads within the members 16 but somewhat short of the bores 15 of the beads.

Members 16 may be formed upon the chain 10 by merely laying beads 11 and links 12 in suitable half-cavities 11' and 12' in a lower die member 17. These cavities 11' and 12' embrace one half of the beads 11 and links 12, and serve to stretch the length of chain tautly across the center of half-cavities 16' in the die member 17. An upper die member, which is practically a duplicate of 17, and therefore not shown (as will be readily appreciated by a mechanic), is then superposed upon the chain 10 and lower die 17 whereupon the plastic material is injected through suitable sprues 18 to form the members 16.

Fig. 2 discloses a modified form of the article shown in Fig. 1, differing therefrom primarily in the use of short lengths of chain 19 instead of long or, more or less, continuous lengths of chain 10, for the purpose of increasing the transparency and luminescence of members 20 when the latter are formed thereon. It has the further advantage of lessening the amount of bead chain required, especially when the members 20 are of elongated form, and makes possible the utilization of short or otherwise scrapped lengths of bead chain.

With this form of the invention it should be particularly noted that ends of short lengths of chain are suitable nested in half-cavities 21 and 22 of a die 23 in such a manner that one bead 11 at the end of each of the chains 19 and 19' projects within a cavity 20' so that only one bead of each short length of chain projects within the member 20 when the latter is molded. The die 23 is only schematically shown in the present drawing; however, it will be readily appreciated that a mating part of similar configuration is merely superposed thereon in order to complete the molding of the member 20, from suitable plastic material, through a suitable sprue 24. The dies 17 and 23 may be of conventional form, held and used in the conventional manner, and are special only in so far as they nest beads or bead chain relative to ornament or enlargement forming cavities.

In those instances when the plastic material is in a rather fluid state or is formed under considerable pressure, the beads 11 within the member 20 preferably have the linkfree bore 15 sealed as by solder 25, by swaging, or by otherwise suitably sealing the same, so that the plastic material cannot seep within the bore of the bead 11 to prevent the link 12 at the opposite side of the bead from pivoting therein.

Further, in connection with this form of the invention it should be particularly noted that the bead or beads 11 enveloped by member 20 or the like may be coated with a hard meltable or fusible material, such as low-melting-point solder, stearic acid (wax), etc. After the members 20, or the like, are molded over the coated beads the members 20 may be heated sufficiently to cause the coating to melt and flow out and thereby create a very slight space between the members 20 and the beads 11 so that the latter may move pivotally within the members. This structure has the advantage of increasing the flexibility of the chain shown in Fig. 2 over that shown in Fig. 1.

Alternatively to using a meltable coating upon a bead, and melting the same, to insure a pivotal movement between the molded member and the bead, a plastic material may be used which has the characteristic of expanding slightly upon cooling or aging to make the members 20 act as loose pivots for beads.

Fig. 3 discloses a connector 26 for use with the completed chains of Figs. 1 and 2 hereinbefore described and with the chains disclosed in Figs. 4, 5, 8 and 10 which are about to be described. This connector 26 includes a molded female connector member 27 with screw threads 28 and a molded male connector member 29 with projecting screw threads 30 cooperable with the threads 28. The members 27 and 29 are connected to the ends of a chain or chains in the manner just described in detail in connection with Fig. 2. These members may also be molded in substantially the same manner as the member 20; or, alternatively, the members 29 may be molded upon the ends of a chain or chains and may then be machined into substantially the hemispherical shape shown in Fig. 3 with the male and female threads 30 and 28 machined thereon. Preferably the members 27 and 29 of the connector 26 are each provided with serrations 26' or the like, to distinguish the connector from other members on a chain and to facilitate both opening and closing the connector.

Fig. 4 discloses a pendant 31 molded upon a chain 10 in the same manner as member 16 is molded upon the chain in Fig. 1. It differs therefrom primarily by having the pendant molded to envelop two of the beads 11, instead of three. It does have the advantages explained in connection with Fig. 1; viz., permitting the links 12 to have the usual free movement with respect to beads 11 molded within the pendant member 31.

Fig. 5 discloses a further modified form of the invention in which a pendant 32 of bell-like or other configuration may be suspended from a necklace 33 or the like by a short length of chain 34. For example, the pendant 32 and short length of chain 34 may readily be associated with member 16 of the chain illustrated in Fig. 1 or with the member 20 of the chain illustrated in Fig. 2, by merely shaping the die 23 to accommodate one more length of chain 34 at a right angle to the chains 19 and 19' and providing a cavity for the pendant 32, as will be readily appreciated. Preferably the uppermost and lowermost beads 11 in the chain 34 are pivotally associated with members 20a and 32 in order to insure maximum freedom of movement, and in order to lessen the strain or wear between the beads 11 and links 12 in the short lengths of chain.

Figs. 6 through 8 disclose another modified form of pendant 35, differing from the pendants previously described merely by being extendible and reversible upon a bead chain 10. These pendants 35 may be used with the chains disclosed in Figs. 1, 2, 3, 4 and/or 5.

It should be particularly noted that pendant 35 is provided with a slot 36 and a plurality of cavities 37 adapted to accommodate links 12 and beads 11, respectively. Preferably the pendant 35 is made of plastic material so that various transparent, luminescent and color effects may be obtained. The provision of a slot 36 and a plurality of cavities 37 enables the manufacturer and/or the user to achieve divers shapes or effects with a single bracelet, necklace, belt, or the like. For example, when a single chain 10 is employed, as shown by solid lines in Fig. 8, it is possible to suspend the enlarged end of the pendant from the chain in any of the cavities 37a, 37b or 37c, achieving a different effect if all or interspersed members 35 are moved into the same or different cavities 37a, 37b or 37c. A further novel effect may be achieved by snapping a plurality of pendants 35 onto a plurality of chains as indicated by the solid-line chain 10 and dotted-line chain 10' in Fig. 8. This chain or chains may be of any desired length, usually dependent upon whether they are to be used as a bracelet, necklace, belt (or for some other purpose).

Fig. 9 discloses an interesting pendant 40 provided by the present invention which may be added to any of the chains hereinbefore described, between the connector 26 by merely screwing stud 41 on the pendant into cavity 28 of member 27 and screwing stud 30 of member 29 into a threaded cavity 42 of the member 40. This pendant may be of any desired configuration.

Fig. 10 discloses a modified form of chain 43, made without metal, including a link 44 of plastic material molded into the shape shown and having beadlike ends 45. These links 44 may be coated with hard wax as explained in connection with Fig. 2, and may then have members 48 molded thereover to provide pivot connection 46 when the wax is later melted therefrom. A series of such links 44 and members 48 may be molded together to form the desired length of chain 43. One or more connections 26 may also be provided thereon. Furthermore, the links 44 may be provided with integral enlargements 47 to accommodate reversible and extensible pendants, such as 35 shown in Figs. 6, 7 and 8. The method and apparatus for making the chain of Fig. 10 may be the same as that for making the chain of Fig. 2 with the slightly large cavities to conform with links 44.

From the foregoing it should be appreciated that the chain or chains provided by the present invention, particularly the forms shown in Figs. 1, 2 and 3, have both utilitarian (sprocket drive chain) and ornamental uses. Further, it should be noted that the chains provided by the present invention lend themselves to a very wide variety of ornamental effects, and to ornamental effects which may be readily altered by either the manufacturer or by the user. Also, kits may be provided whereby a user may: make up double or triple chain belts; convert the belt into long and/or short necklaces; use the kit to make one or more of the necklaces or belts into single or multiple bracelets; have sets of pendants of different colors and different shapes in the kit and thereby change belts, bracelets, necklaces, etc., to get different color and/or shape effects.

The bead chain may be of divers sizes and shapes. For example, the chain of Fig. 1 could have the beads in oval, diamond and/or other shapes as will be readily appreciated since bead chains have already been made with the beads of widely different shapes. Likewise the members molded thereon may be of any preferred configuration.

Alternatively to using a bead chain in the different forms of the invention hereinbefore described in detail, and as shown in Fig. 11, link chain 50 may be used, preferably with an end or enclosed link 50a projecting slightly (about the thickness of the link material) from a molded member 51 and with the immediately adjacent and more exposed link member 50b projecting slightly (about the thickness of the link material—see Fig. 11) within the molded member 51. The latter link member 50b is preferably movable in the member 51 by use of the materials and methods hereinbefore described to pivot the beads in the plastic members.

Other variations and modifications may be made within the scope of this invention and portions of the improvements may be used without others.

Having thus described the invention what is claimed as new is:

1. In a chain, the combination of at least one bead; at least one link in said bead; and at least one member with a normally open slot and a plurality of cavities therein adapted to receive said bead.

2. In a chain, the combination of at least one bead with at least one opening; and a member molded substantially over said bead, with the opening exposed and a link with one end thereof enveloped by said bead in said member and the other end thereof projecting out of said opening and extraneously of said member.

3. In a chain, the combination of at least one link; at least one bead having a sealing means and an opening with said link projecting therethrough; and a member molded substantially over said bead, yet clear of said link.

4. In a chain, the combination of a pair of separated beads; at least one link associated with at least one of said beads; a female connector member molded directly upon one of said separated beads; and a male connector member on the other of said pair of separated beads and cooperable with the female connector member.

5. In an ornamental chain, the combination of a plurality of beaded members; a plastic main member at least partially enveloping said beaded member; a plastic pendant member at least partially enveloping one of said beaded members; a two-piece connector in said chain; and a pendant between and secured to said chain by said connector.

6. In a chain, the combination of a beaded member having an integral end; and a plastic member having an integral cavity defined by a spherical wall partially enveloping and pivotally supporting said integral end.

7. In a chain, the combination of a large molded member; and a smaller member having one section thereof partially enclosed by and movable within said large molded member.

8. In a chain, the combination of at least one section of a chain including a bead and a shank portion connected to and extending from said bead; and a member molded over said bead, said molded member being so shaped and so positioned relative to said bead and said extending shank portion that the latter may be moved at least an appreciable extent without engaging said molded member.

9. In a chain, the combination of a beaded member having an integral end; and a plastic member having an integral cavity defined by a spherical wall partially enveloping and supporting said integral end.

10. In a chain, the combination of a plurality of articulated links; and at least one plastic member, at least one of said links having an end means loosely engaged and molded in said plastic member.

11. In a chain, the combination of a plurality of articulated members; and at least one member with a normally open slot and a plurality of cavities therein adopted to receive one of said articulated members.

DAVID S. ROSS,